March 31, 1925.
A. W. WESTAWAY
STEERING WHEEL LOCK
Filed Feb. 26, 1923
1,532,009
3 Sheets-Sheet 3
Fig. 3.
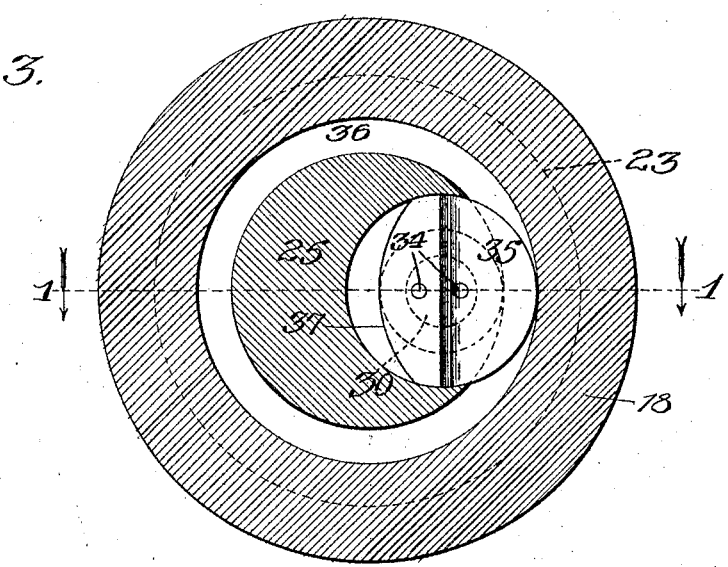
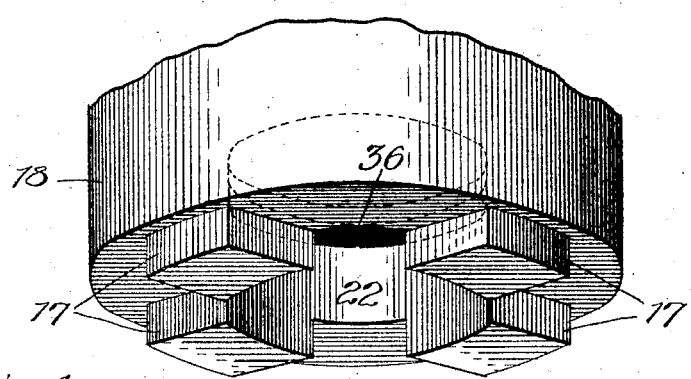
Fig. 4.
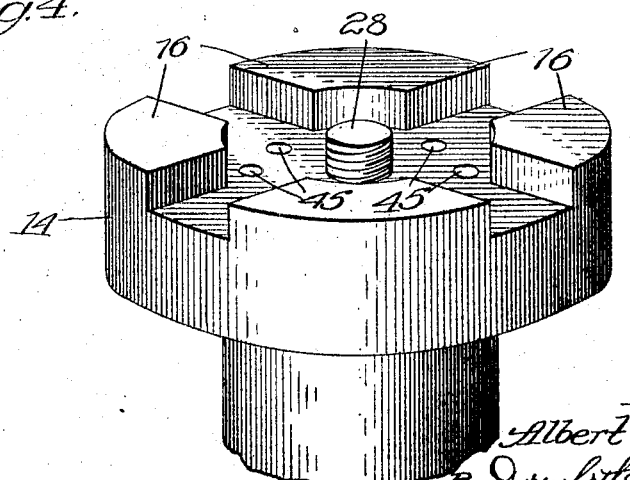
Inventor:
Albert W. Westaway,
By Dyrenforth, Lee, Chritton & Wiles,
Attys.

Patented Mar. 31, 1925.

1,532,009

UNITED STATES PATENT OFFICE.

ALBERT W. WESTAWAY, OF CHICAGO, ILLINOIS, ASSIGNOR OF ONE-HALF TO DANIEL F. H. SCHROEDER, OF CHICAGO, ILLINOIS.

STEERING-WHEEL LOCK.

Application filed February 26, 1923. Serial No. 621,202.

*To all whom it may concern:*

Be it known that I, ALBERT W. WESTAWAY, a citizen of the United States, residing at Chicago, in the county of Cook and State of Illinois, have invented a new and useful Improvement in Steering-Wheel Locks, of which the following is a specification.

This invention relates to steering wheel locks and the like, and is fully described in the following specification and shown in the accompanying drawings, in which:

Fig. 3 is a section through the cap member on the line 3—3 of Fig. 2; and

Fig. 4 is a perspective view of the upper and lower clutch elements.

Figure 1:
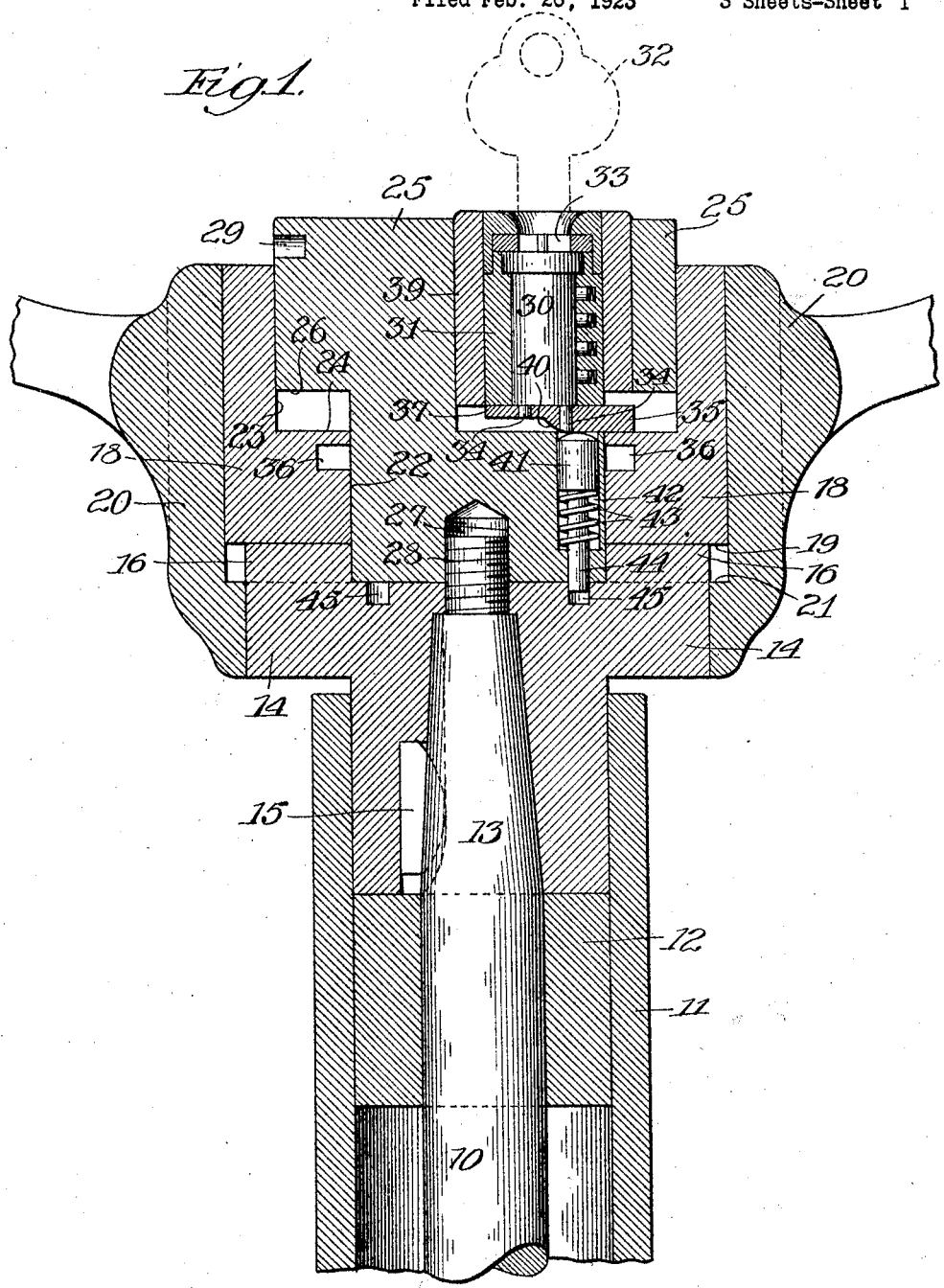
Figure 1 is a longitudinal section showing a steering wheel in locked or driving position.

The embodiment illustrated comprises a steering column having a steering shaft 10 enclosed within the housing 11 and journaled at its upper end in a suitable bearing 12. The upper end of the shaft 10 is preferably tapered at 13 and on which is snugly fitted a lower clutch element 14 which preferably extends down into the casing 11 and is secured to the shaft 10 in any suitable manner, as by means of a key 15.

The upper face of the lower clutch element 14 is provided with a series of teeth 16 which engage similar teeth 17 on the upper clutch element 18. The peripheries of the lower and upper clutch elements 16 and 18, respectively, are cylindrical, the latter being larger so as to form a ledge 19, and both are enclosed in the hub 20 of the steering wheel.

The upper clutch element has a cylindrical bore 22 and a counter-bore 23 separated therefrom by an annular shoulder 24. A nut or cap member 25 having a shoulder 26 is adapted to be journaled within these bores and is threaded at 27 to receive the threaded end 28 of the shaft 10.

The cap member 25 is provided with one or more holes 29 on its periphery, whereby a spanner wrench may be applied for tightening the cap member when the upper clutch element 18 is in the lowered position as shown in Fig. 1.

The upper clutch element 18 is firmly secured in the hub 20 of the steering wheel by any suitable means (not shown) so that when the upper clutch element is unlocked or released, as will later be explained, the operator may readily lift the wheel and upper clutch element from the locked or driving position shown in Fig. 1 to the unlocked or idle position shown in Fig. 2. In the latter position the teeth 17 are raised so as to clear the teeth 16, and as long as the wheel is held in this position the shaft 10 is completely disconnected from the steering wheel.

The means illustrated for locking the elements in either the driving or idle positions comprises a well-known form of lock having a tumbler 30 journaled in a barrel 31. This barrel is turned by means of a key 32 inserted through the key-plate 33 in a well known manner. The lower end of the barrel 30 has two pins 34 which engage holes in the locking plate 35. The center of this plate is placed near the edge of the cap member 25 so that it normally extends beyond the reduced portion of the cap member. In the driving position the plate 35 normally overlies the ledge 24 of the upper clutch element so that as long as the plate 35 is in the position shown in Fig. 1 the steering wheel cannot be raised and thus disconnected from the lower clutch element 14 and the shaft 10.

Figure 2:
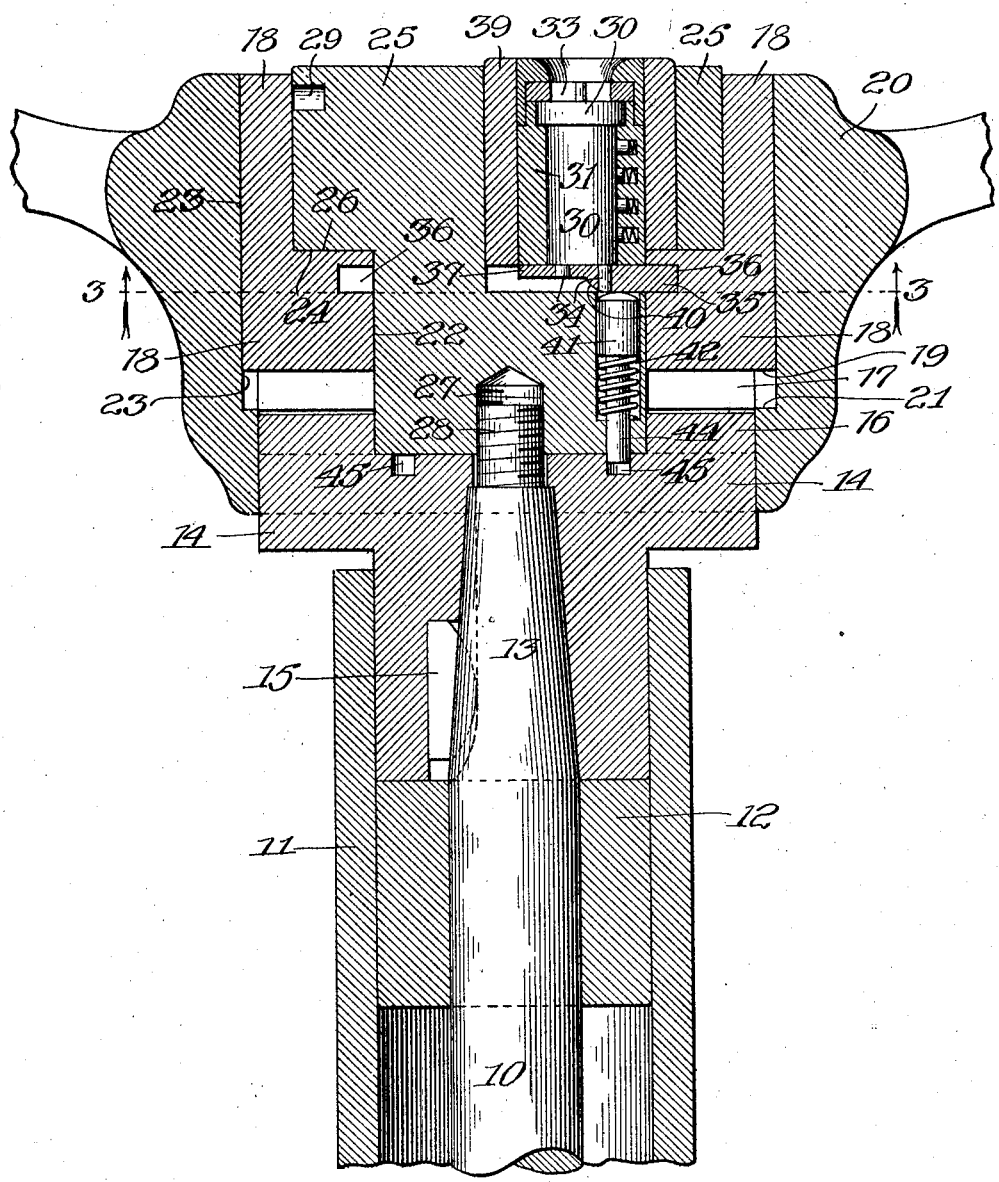
Fig. 2 is a similar section showing the steering wheel in unlocked or idling position.

An annular groove 36 is formed within the smaller bore of the upper clutch element 18 and at a distance from the ledge 24 which will permit the teeth 17 of the upper clutch element to clear the teeth 16 of the lower clutch element when the plate 35 is inserted in the groove 36 as shown in Fig. 2. It will be observed that in this latter position the wheel 20 can be turned indefinitely and without moving the shaft 10.

In order to permit the plate 35 to be moved from the position shown in Fig. 1 to that of of Fig. 2, one side of the face 37 is removed as shown in Fig. 3 so that when the tumbler 30 is turned 180° from the position shown in Figs. 1 and 2 the face 37 will lie within the periphery of the smaller diameter of the cap member, thus permitting the upper clutch element to be moved readily thereover.

The tumbler 30 is enclosed in the lock casing 31 which is pressed or otherwise secured in a housing 39 which in turn is pressed into a cylindrical opening in the cap member 25. This housing is made of substantially the same diameter as the locking plate 35 so that the plate and housing may be pressed into place.

The locking plate 35 also has a cam 40 formed on its bottom. A pin 41 is slidable in a hole 42 in the cap member 25 and is held against the cam by a spring 43. This pin has a reduced end 44 adapted to engage a series of holes 45 in the lower clutch element 14. As long as the locking member 35 remains in the position shown, the pin 44 will engage one of the holes 45, thereby preventing the cap member 25 from being unscrewed. When, however, the plate 35 is turned 180° from its present position so that the face 37 registers with the bore 22, the pin 41 rides up on the thin part of the plate 35 thereby withdrawing the reduced end 44 out of the hole 45 and permitting the cap member 25 to be unscrewed by means of the spanner wrench applied to the hole 29.

The operation of the wheel locking device is as follows:

With the steering wheel in the driving position as shown in Fig. 1 the operator inserts the key 32 and turns the tumbler 30 and plate 35, 180° from its position as shown in Figs. 1 and 3, at which time face 37 will be presented to the upper clutch element 18 and the latter can then be raised to the position shown in Fig. 2. The key 32 is then turned back to its original position, at which time the plate 35 will fall within the annular groove 36. By reversal of this operation the parts may be returned to their original position.

By this arrangement all of the operative parts of the device are enclosed and in the unlocked or idle position the hole 29 is completely covered so that it is very difficult for anyone without the key 32 to bring the parts again into driving position. To increase this difficulty all of the exposed parts are carbonized or otherwise hardened so as to make it impossible to use a drill or hacksaw on the parts.

While I have shown and described but a single embodiment of my invention, it is to be understood that it is capable of many modifications. Changes, therefore, in the construction and arrangement may be made which do not depart from the spirit and scope of the appended claims in which it is my intention to cover all novelty inherent in my invention as broadly as possible in view of the prior art.

What I claim as new, and desire to secure by Letters Patent, is:

1. In a steering wheel lock, a steering shaft, a lower clutch element secured thereto, an upper clutch element adapted to operatively engage said lower clutch element, a steering wheel secured to said upper clutch member, a cap member secured to said shaft, said upper clutch member being journaled on said cap member and movable into and out of operative relations to said lower clutch element, and means carried by said cap member for locking said clutch members in operative and inoperative positions.

2. In a steering wheel lock, a steering shaft, a lower clutch element secured thereto, an upper clutch element adapted to operatively engage said lower clutch element, a steering wheel secured to said upper clutch member, a cap member screwed on said shaft, said upper clutch member being journaled on said cap member and movable into operative and inoperative relations to said lower clutch element, and a hole on said cap member adapted to receive a tool for turning said cap member, said hole being exposed when said clutch elements are in operative position and covered by said upper clutch element when in inoperative position.

3. In a steering wheel lock, a steering shaft, a clutch member secured to said shaft, a cap member secured to said shaft, a second clutch member movable on said cap member into operative and inoperative relations to said first mentioned clutch member, a steering wheel secured to said second clutch element, a ledge on said second clutch element, a shoulder on said cap member limiting the outward movement of said second clutch element, and means for locking said second clutch element in inoperative relation.

4. In a steering wheel lock, a steering shaft, a clutch member secured to said shaft, a cap member secured to said shaft, a second clutch member movable on said cap member into operative and inoperative relations to said first mentioned clutch member, a steering wheel secured to said second clutch element, a ledge on said second clutch element, a shoulder on said cap member limiting the outward movement of said second clutch element, an annular groove in said second clutch element, and a locking member carried by said cap member adapted to engage said ledge or said groove to lock the clutch elements in operative or inoperative positions.

5. In a steering wheel lock, a steering shaft, a clutch member secured to said shaft, a cap member secured to said shaft, a second clutch member movable on said cap member into operative and inoperative relations to said first mentioned clutch member, a steering wheel secured to said second clutch element, a ledge on said second clutch element, a shoulder on said cap member limiting the outward movement of said second clutch element, means for locking said second clutch element in inoperative relation and means operatively connected to said last mentioned means for locking said clutch member and said cap member together.

6. In a steering wheel lock, a steering shaft, a clutch member secured to said shaft, a cap member secured to said shaft, a second clutch member movable on said cap member into operative and inoperative relations to said first mentioned clutch member, a steering wheel secured to said second clutch element, a ledge on said second clutch element, a shoulder on said cap member limiting the outward movement of said second clutch element, an annular groove in said second clutch element, a locking member carried by said cap member adapted to engage said ledge or said groove to lock the clutch elements in operative or inoperative positions, and means operable by said locking member for locking said clutch member and said cap member together.

7. In a steering wheel lock, a steering shaft, a clutch member secured to said shaft, a cap member secured to said shaft, a second clutch member movable on said cap member into operative and inoperative relations to said first mentioned clutch member, a steering wheel secured to said second clutch element, a ledge on said second clutch element, a shoulder on said cap member limiting the outward movement of said second clutch element, an annular groove in said second clutch element, a locking member carried by said cap member adapted to engage said ledge or said groove to lock the clutch elements in operative or inoperative positions, and a cam formed on the bottom of said locking member, a pin slidable in said cap member and movable by said cam into and out of locking position with said first mentioned clutch member.

ALBERT W. WESTAWAY.